May 28, 1940.   A. D. NASH   2,202,714

METHOD OF PRODUCING A CELLULAR GLASS PRODUCT

Filed Oct. 20, 1937

INVENTOR.
ARTHUR D. NASH
BY Bradley & Bee
ATTORNEYS.

Patented May 28, 1940

2,202,714

UNITED STATES PATENT OFFICE 2,202,714

METHOD OF PRODUCING A CELLULAR GLASS PRODUCT

Arthur D. Nash, Sewickley, Pa., assignor to Pittsburgh Plate Glass Company, a corporation of Pennsylvania Application October 20, 1937, Serial No. 169,987

3 Claims. (Cl. 49—82)

The invention relates to cellular glass, known in the art, and comprising plates or blocks of glass composition of low specific gravity incident to the formation throughout the glass of small non-communicating cells filled with air, carbon dioxide or other gases formed in the body of the glass while in a molten or plastic condition. The glass may be produced by various processes, the most successful involving the mixture of bubble forming material, such as finely divided calcium carbonate with crushed glass, and heating until the mass is plastic at which time the calcium carbonate decomposes, producing carbon dioxide gas, which causes the mass to swell to the desired extent, after which the heating process is arrested and the slab or block produced is annealed. The formation of the slab occurs in a metal or fused silica mold, and the surface of the glass where it contacts with the mold has a glaze or crust thereon of good appearance which is cleanable and to which a colored glaze for decorative purposes is applicable, but if the product is made in thick blocks (which is the most practicable method of production) and such blocks are sawed into plates to use as paneling or tile, the surfaces left by such cutting are rough and porous, incident to the cellular formation of the material. If the product is used inside a wall merely for insulation purposes, this is immaterial, but the rough surfaces are not suitable for direct exposure, as in wall facings, because of the appearance and because of the difficulty of cleaning. These surfaces are also not readily subject to the application of a colored glaze or to the application of a coating of any kind.

Figure 1:
Figure 2:
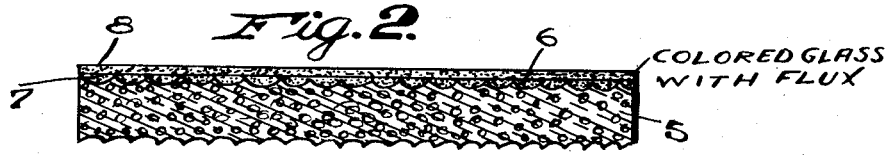
Figure 3:
Figure 4:
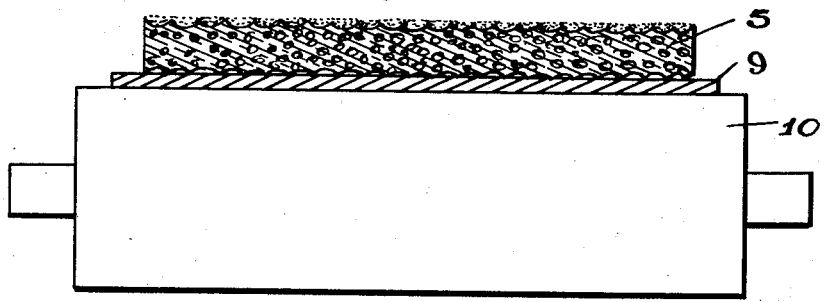

The primary object of the present invention is to overcome this difficulty, as to rough surfaces, and to so treat such surfaces that they have a smooth, vitreous finish. A further object is to give the finished surface a vitreous glaze of any desired color which is as permanent as the material of the plate or slab itself. Still another object is the accomplishment of the objects above stated at a low cost. The process and article are illustrated in the accompanying drawing, wherein:

Figures 1 and 2 illustrate steps in the process, the size of the pores or cells and the thickness of the upper layers being much exaggerated for clearness of illustration. Fig. 3 is a section through the completed article. And Fig. 4 illustrates the method of supporting the plate in in carrying it through a roller leer.

Referring to Fig. 1, 5 is a plate of cellular glass which has been sawed or cut from a larger slab and which has its surfaces true and flat, but rough, due to the pores or cells which are cut through in the sawing operation. The pores 6 on the upper face of the block are first filled with crushed glass 7, so finely divided that it will pass through a 40 mesh screen. This is preferably done by applying an excess of glass and then smoothing off with a straight edge.

The second step is the application of a layer 8 consisting of a mixture of crushed colored glass, and a flux, such as lead borate. Here again, the glass is crushed so that it will pass a 40 mesh screen. The proportions of glass and flux will vary depending upon the character of the glass and the type of flux used. In the case of an ordinary lime glass and a lead borate flux, proportions giving good results range from 66⅔ per cent to 75 per cent of glass and 33⅓ per cent to 25 per cent of flux. This layer is applied by a suitable feeder designed to give a layer of uniform thickness.

After the plate has been prepared as above described, it is fired, preferably by passing through a roller leer in which the temperature increases to a point ranging from 1400 to 1500 deg F., and then drops through the annealing range and down to the handling temperature at the outlet end of the leer. In such movement, the glass plates are carried on refractory plates 9 (Fig. 4) which are in turn carried by leer rolls 10, one of which is shown. The plates 10 may be of clay or fused silica or refractory metal compositions, such as nickel chromium, and a layer of sand, lime or other finely divided refractory material may be interposed between such plates and the glass plates in order to obviate any tendency to adherence.

At the temperature range specified, the layers of crushed glass 7 and 8 are fused without affecting the cellular structure of the glass plates. This lower fusing point of the crushed glass is due to the finely divided character of the material and the presence of the flux in the colored glass layer. This flux reduces the melting point of the clear glass 7, as well as that of the upper layer 8, since some of the flux penetrates downward into the glass 7 as the melting of the upper layer progresses.

The process gives a smooth surface layer 11 (Fig. 3) of colored glass bonded securely to the clear glass 7, filling the pores of the plate and to the body of the plate itself. Such surface has superior weathering characteristics and can be used where the faces of the plates are exposed to outside weather conditions. The tile and wall facings as thus produced give high insulating values and a surface finish comparable with glass faced tile and paneling which lack the insulating value of cellular glass.

While a single firing of the article, as heretofore described, is preferable, it is possible to employ two firing operations, the clear glass 7 being applied and the article fired, followed by the application of the layer 8 and a second firing. This is a more costly procedure, however, and requires the use of a flux with the layer 7 as well as the layer 8. It is also possible to apply only a single layer of colored glass mixed with flux, but this is also more expensive than the two layer operation described, as more flux is required, and the greater amount of flux and colored glass add materially to the cost, such materials being relatively more expensive than the clear layer which is of low cost. These alternative methods of procedure are, however, comprehended by my invention. It will also be understood that any type of tunnel kiln may be used in carrying out the invention and the plates may be carried on cars or conveyors other than the rolls shown.

What I claim is:

1. A method of treating the porous surface of a plate of cellular glass which consists in supporting the plate with such surface horizontal, applying a layer of finely crushed glass with a flux in contact therewith to the surface, passing a straight edge over the surface to remove the excess crushed glass leaving the pores in the surface filled with crushed glass, exposing the plate to a temperature sufficient to fuse the crushed glass but below the temperature at which the cellular structure of the plate is affected, and then annealing the plate.

2. A method of treating the porous surface of a plate of cellular glass which consists in supporting the plate with such surface horizontal, applying a layer of finely crushed clear glass to the surface, leveling off the excess glass with a straight edge, leaving the pores of the surface filled with crushed glass, covering the filled surface with a layer of finely crushed colored glass mixed with a flux, exposing the plate to a temperature sufficient to fuse the crushed glass, but below the temperature at which the cellular structure of the plate is affected, and then annealing the plate.

3. A method of treating the porous surface of a plate of cellular glass which consists in supporting the plate with such surface horizontal, applying a layer of finely crushed glass mixed with a flux to the surface in excess of that required to fill the pores in the surface, removing the excess of crushed glass outside the pores, exposing the plate to a temperature sufficient to fuse the crushed glass but below the temperature at which the cellular structure of the plate is affected, and then annealing the plate.

ARTHUR D. NASH.